United States Patent [19]

Sekmakas et al.

[11] 4,396,732

[45] Aug. 2, 1983

[54] WATER SOLUBLE AMINE RESINS WHICH ARE MANNICH BASES

[75] Inventors: Kazys Sekmakas, Palatine; Raj Shah, Schaumburg, both of Ill.

[73] Assignee: DeSoto, Inc., Des Plaines, Ill.

[21] Appl. No.: 282,512

[22] Filed: Jul. 13, 1981

[51] Int. Cl.³ .................. C08G 14/06; C08G 59/02; C08G 59/14; C08G 59/50

[52] U.S. Cl. .................. 523/416; 523/414; 523/417; 523/596; 523/598; 523/507; 523/525; 523/107; 523/121; 523/149; 523/153; 523/155; 523/181 C

[58] Field of Search .......... 528/153, 107, 121, 155, 528/149; 525/507; 260/29.3; 524/596, 598; 523/414, 416, 417

[56] References Cited

U.S. PATENT DOCUMENTS

| | | | |
|---|---|---|---|
| 3,994,989 | 11/1976 | Kempter et al. | 260/29.3 X |
| 4,001,155 | 1/1977 | Kempter et al. | 260/29.3 X |
| 4,155,847 | 5/1979 | Tanaka et al. | 260/29.3 X |
| 4,269,742 | 5/1981 | Goeke et al. | 525/507 X |
| 4,278,580 | 7/1981 | Schmölzer et al. | 525/507 X |

Primary Examiner—Howard E. Schain
Attorney, Agent, or Firm—Dressler, Goldsmith, Shore, Sutker & Milnamow, Ltd.

[57] ABSTRACT

An amine resin soluble in water with the aid of an acid is produced by reacting a dihydric phenolic compound, such as a bisphenol, with a stoichiometric deficiency of preferably aromatic diepoxide, and then reacting the product containing less than −0.3 part of unreacted dihydric phenolic compound per part of reaction product with at least about 3.25 mol of formaldehyde per mol of said reaction product and with monosecondary amine to produce a Mannich base. This Mannich base is then reacted with additional diepoxide in an amount of from 0.5 to 2 epoxy equivalents per epoxy equivalent in the initially used diepoxide.

10 Claims, No Drawings

WATER SOLUBLE AMINE RESINS WHICH ARE MANNICH BASES

DESCRIPTION

1. Technical Field

This invention relates to water soluble amine resins which are Mannich Bases. These resins are particularly useful in cathodic electrocoating.

2. Background Art

Water soluble amine resins are potentially useful in cathodic electrocoating, and numerous efforts to develop resins which solubilize in water without excessive acidity, which do not settle out on storage, and which electrodeposit at the cathode and cure to develop good properties have been carried out. It is particularly desirable to employ a resinous system which will cure at relatively low temperature, such as 350° F., but this has frequently required the presence of blocked polyisocyanates which introduce undesirable expense.

It is also desirable to employ resins which possess a bisphenolic backbone, as is found in epoxy resins, since such resins possess good physical and chemical properties.

An interesting effort in this direction is provided in U.S. Pat. No. 4,001,155 in which a bisphenol is reacted with up to 4 molar proportions of formaldehyde and then with about the same molar proportion of monosecondary amine to provide a Mannich base which is then reacted via its phenolic OH groups with from 0.6 to 1.3 equivalents of epoxide functionality per mol of the diphenol which is reacted with formaldehyde. The resulting amine-functional resin is solubilized in water with the aid of an acid, and is useful in cathodic electrocoating.

In contrast with the prior art, in this invention it is desired to increase the proportion of epoxy-functional material which can be incorporated and to simultaneously improve the stability of the aqueous solutions and dispersions which are formed. More particularly, the solubility is improved and the unreacted monosecondary amine reacts with the diepoxide so as to reduce the conductivity of the aqueous system which is formed. Indeed, prior to reaction with the diepoxide, water solubility with the aid of an acid in this invention is poor, but after reaction with the diepoxide, solubility is excellent, and this is surprising. The systems of this invention are more complex than those of the prior art, so that the avoidance of gelation is itself surprising.

Another prior disclosure of interest is the suggestion in U.S. Pat. No. 3,994,989 to add a large amount of bisphenol to a bisphenol-diepoxide reaction product before reaction with formaldehyde and monosecondary amine. In contrast, the systems of this invention cannot tolerate any substantial addition of bisphenol, and while small amounts can be tolerated, the amounts contemplated in this prior disclosure are detrimental, and the amounts normally used therein completely destroy the desired water solubility. The smallest proportion of added bisphenol in U.S. Pat. No. 3,994,989 is 0.33 part of bisphenol per part of bisphenol-diepoxide reaction product (this ignores any unreacted bisphenol in the reaction product).

DISCLOSURE OF INVENTION

In accordance with this invention, a dihydric phenolic organic compound, preferably a bisphenol, is reacted with a stoichiometric deficiency of a diepoxide, and then the product is reacted with at least about 3.25 mols of formaldehyde per mol of dihydric phenolic compound (the bisphenol), and also with monosecondary amine, to thus produce Mannich base groups. While U.S. Pat. No. 4,001,155 normally uses from 2-3 mols of formaldehyde per mol of bisphenol, we prefer to use more than 3.5 moles of formaldehyde per mol of starting diphenolic organic compound, and we preferably use at least about 4 mols of formaldehyde per mole of starting bisphenol. The Mannich base so-produced is then reacted with epoxide-functional material, preferably a diepoxide, to provide the product which is solubilized in water with the aid of a solubilizing acid.

The function of the large proportion of formaldehyde is not entirely understood, but excellent solubility in water at the 4 molar proportion ratio is reduced to very good solubility at 3.5 mols and to marginal solubility at 3.0 mols. At 2.0 mols of formaldehyde, the product is completely insoluble in water. These results were found in a series of runs in which only the formaldehyde proportion was changed.

In contrast with the teachings of U.S. Pat. No. 4,001,155, we normally use more than 1.5 equivalents of epoxide functionality per mol of dihydric reaction product, and we prefer to use more than 2 equivalents of epoxide on the same basis since this importantly improves solubility in water.

In contrast with the teachings of U.S. Pat. No. 3,994,989, it is preferred to avoid the addition of any bisphenol to the bisphenol-diepoxide reaction product. In forming such reaction product, a small amount of bisphenol may remain unreacted, and this is tolerated. Up to 0.2 part of bisphenol can be added in this invention to the reaction product which provides a total of about 0.3 part of unreacted bisphenol in admixture with each part of reaction product, but even this small addition is noticeably detrimental, though it can be tolerated. Thus, less than about 0.3 part by weight of unreacted bisphenol must be present per part of reaction product at the time when the reaction with formaldehyde and monosecondary amine is carried out to form the Mannich base.

The bisphenols which can be used in accordance with this invention are the same as those described in U.S. Pat. No. 4,001,155, narmely, those having the structure:

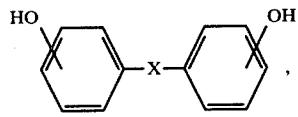

wherein X is a straight chain or branched chain divalent aliphatic radical of from 1 to 3 carbon atoms, or $>SO_2$, $>SO$, or —O—.

This know class of compounds is broadly referred to as bisphenols. The preferred bisphenol is bisphenol A in which X is 2—2, propylidene and the two OH groups are in the para position. Other bisphenols which can be used as illustrated by 4,4'-thiodiphenol and 4,4'-sulfonyl diphenol. Dihydric phenolic organic compounds other than bisphenols are illustrated by resorcinol.

The diepoxides are preferably aromatic, especially diglycidyl ethers of a bisphenol having a molecular weight of about 350 to about 5000, preferably 350 to 600. Aliphatic diepoxides, such as glycerin diglycidyl ether, are also useful. Monoepoxides may be present so long as there is a 1,2-epoxy equivalency of at least about 1.4. From 0.3 to 0.6 equivalents of epoxide are used per equivalent of phenolic OH in the dihydric compound. Based on the reaction product, at least 6% to 12% of unreacted bisphenol usually remains.

The reaction with formaldehyde is conventional and is illustrated in the examples. It is preferred herein to first react with formaldehyde, at least to solubilize this reactant, and then to add the monosecondary amines which are to be used.

Any monosecondary amine may be used, exactly as in the prior art. These have the formula R—NH—R' where R and R' may be the same or different and are desirably $C_1$-$C_8$ alkyl and the corresponding alkanol. These are illustrated by di-N-butyl amine or di-N-ethyl amine. Diethanol amine will illustrate the hydroxy functional amines which are useful. The dialkyl amines and the hydroxy alkyl amines are desirably used in admixture. It is desirably, but not essential to use a stoichiometric deficiency of the amine component.

The reaction between the methylol derivative which is produced by reaction with formaldehyde and the monosecondary amine will be illustrated in the examples.

The resulting Mannich base is then reacted with additional diepoxide which need not be aromatic, but which is preferably of the same aromatic type used to form the initial bisphenol-diepoxide reaction product. From 0.5 to 2 epoxy equivalents are used per epoxy equivalent in the diepoxide initially used, preferably from 1 to 1.5 equivalents on the same basis.

The final product is then dispersed in water with the aid of a solubilizing acid. The solubilizing acids are well known and will be illustrated herein by acetic acid. The acid proportion is governed by the acidity of the final bath which may range from quite acid to slightly alkaline. The pH is preferably in the range of pH 5—9, most preferably 6-8.5.

The products of this invention may contain methylol groups and self cure, but it is preferred to add a curing agent to enhance the cure. Aminoplast resins and phenoplast resins are well known for this purpose and are useful herein in an amount for from 2% to about 35%, based on the weight of the Mannich base-epoxide reaction product. The section of the curing agent which is optionally used is illustrated in the examples, but is not a feature of this invention. From 10% to 35% of aminoplast represents preferred practice.

Organic solvents are also used and the selection of these is not critical. Alcoholic solvents, such as butanol, are quite useful, but even ketone solvents, such as methyl ethyl ketone, which may react with the amine reactants to some extent, may be employed.

BEST MODE FOR CARRYING OUT THE INVENTION

EXAMPLE 1

543 grams of diglycidyl ether of bisphenol A having an epoxide equivalent weight of 181 (Dow DER 333 [3 equivalents]) and 680 grams of bisphenol A (6 equivalents) and 270 grams of 2-butoxy ethanol solvent are charged to a reactor and heated to 170° C. This temperature is maintained for 5 hours to provide a bisphenol-terminated derivative. The product is cooled to 30° C. and 550 grams of isopropanol solvent and 400 grams of paraformaldehyde (13.3 equivalents) are added over 30 minutes with agitation. The formaldehyde reacts with the activated positions on the aromatic rings in an exothermic reaction to provide methylol functionality. The exotherm increases the temperature to about 40° C. After 2 hours the reaction is complete.

440 grams of di-N-butyl amine (3.4 equivalents) and 500 grams of diethanol amine (4.76 equivalents) are premixed and added to the reactor over a 30 minute period with agitation at 30° C. and the temperature gradually increases as a result of an exothermic reaction to 80° C. and the reaction mixture is held at that temperature for 3 hours to provide a Mannich base.

600 grams (3.3 equivalents of the same diglycidyl ether used initially) are added over a 30 minute period at 75° C. together with 120 grams of methyl ethyl ketone solvent. The mixture is held at 75° C. for 4 hours and is then cooled.

EXAMPLE 2

100 grams of the 67.1% solids solution produced in Example 1 are mixed with 14 grams of methylated-ethylated benzoguanamine-formaldehyde condensate (American Cyanamid product XM 1123) and 6 grams of acetic acid. 680 grams of deionized water are then added slowly with rapid agitation to disperse the polymer and the cross-linker in the aqueous medium. The pH of the resulting solution is 6.4.

Zinc phosphate treated steel panels were coated with the epoxy-based cationic polymer solution of this Example using a undirectional electrical current to deposit the resins on the panels as cathode. The following results were obtained.

Using 75 volts for electrodeposition, a film 0.3 mil in thickness was obtained. At 100 volts, the film was 0.55 mil and at 150 volts the film had a thickness of 0.75 mil. These coated steel panels were rinsed after electrodeposition with deionized water and baked at 375° F. for 20 minutes. The baked coating passed 100 double rubs with a methyl ethyl ketone-saturated cloth and had excellent flexibility as indicated by passing a 60 inch/pound reverse impact test. The cured films were very hard (4H pencil hardness) and this is an achievement keeping in mind the excellent flexibility which is also present.

It will be observed that Example 1 reacted 3 equivalents of epoxide with 6 equivalents of bisphenol A (3 moles) so that there is theoretically enough epoxide to react with every molecule of bisphenol A. In practice, it is found that when the epoxide is substantially completely consumed, the product contains about 12% of unreacted bisphenol A. Commercially available products of this character are reported to contain as much as 18% of unreacted bisphenol A. Thus, and in preferred practice, up to about 18% of unreacted bisphenol A may be present, and it is not desirable to add any.

EXAMPLE 3

Example 1 was repeated with the addition of 680 grams of bisphenol A after the completion of the bisphenol A-diepoxide reaction. This provides a mixture having a ratio of 64 parts reaction product (ignoring unreacted bisphenol A) to 36 parts of added bisphenol. The product was insoluble in water. Reducing the added bisphenol to 340 grams, the water solubility was rated at very poor. At an addition of only 170 grams (ratio of 87.8 reaction product to 12.2% added bisphenol, the water solubility was fair-good. Example 1 repeated without change produced excellent water solubility.

These solubility characterizations were determined using an acid solution containing 115 grams of dimethylol propionic acid in enough deionized water to provide 1000 grams of water solution (dissolve at 70° C.). 250 grams of polymer solution to be tested and 75 cc of acid solution was mixed thoroughly (35% neutralization) and 675 grams of deionized water are added slowly with mixing. The product is a milky dispersion at 16% solids (pH=8.1). The Example 1 solution showed no settling after 4 weeks of standing without agitation. The fair-good rating was assigned because some slight settling was observed. The very poor rating was assigned because a cake was observed at the bottom of the test beaker. The insoluble rating was based on the observation of a heavy cake indicating that the bulk of the resin present was at the bottom of the beaker.

The addition of bisphenol in the environment of this invention is counterproductive to the desired water dispersibility, and the more bisphenol is added, the worse the result.

EXAMPLE 4

Example 1 was repeated using 2 equivalents of Epon 829 (Shell) [a diglycidyl ether of bisphenol A with an epoxide equivalent weight of 192] and 4 equivalents of bisphenol A in 185 grams of 2-butoxy ethanol solvent. After the 5 hour reaction at 170° C., the product was cooled at 35° C. and 8 equivalents of paraformaldehyde in 375 grams of isopropanol were added and dissolved in 30 minutes. This provides 4 equivalents of formaldehyde per mol of diepoxide-bisphenol reaction product.

A solution of 1.67 equivalents of di-n-butyl amine and 2.33 equivalents of diethanol amine in 111 grams of isopropanol are then added over 30 minutes at 35° C. and the temperature is raised to 80° C., hold for 3 hours, and then cooled to 70° C. 1.56 equivalents of additional Epon 829 were then added in solution in 67 grams of methyl ethyl ketone over a period of 30 minutes at 70° C. and this temperature is maintained for 4 hours. The product was then cooled to 25° C. It had a resin solids content of 64.0% and a viscosity (Gardner) of $Z_4$.

EXAMPLE 5

125 grams of the 64% solids polymer solution of Example 4 were mixed with 20 grams of methylated-ethylated melamine-formaldehyde condensate (American Cyanamid Product XM-1116) and 10 grams of water. Dimethylol propionic acid was then mixed in using 35% neutralization to provide a pH of 8.0 upon dilution with deionized water to 8% resin solids content.

Zinc phosphate treated steel panels were electrocoated at the cathode at 100 volts and the coated panels were baked 20 minutes at 400° F. The coatings so-produced were 0.7 mil thick. On testing, the impact resistance was 80 inch/lbs. (both direct and reverse), the $\frac{1}{8}$ inch mandrel bend flexibility test was passed, and the pencil hardness was 5H. On detergent testing (1% solution at 165° F.), the coatings passed 400 hours of testing. On salt spray testing (5% salt fog), the coatings passed 750 hours.

The 8% bath of this example was maintained under constant agitation for 36 days at 85° F.–90° F. The bath retained its excellent stability and coating properties after 36 days.

EXAMPLE 6

Example 4 was repeated using 4 equivalents of paraformaldehyde instead of 8, thus reducing the 4:1 ratio of Example 4 to 2:1. The solubility in water was very poor. In a side-by-side comparison, an 8% solids aqueous dispersion of the Example 4 product made using dimethylol propionic acid to provide a pH of 8.0 was stable for 36 days under continuous agitation. The corresponding 8% aqueous dispersion of this Example 6 product at pH 8.0 quickly formed a heavy gummy precipitate on the bottom of the beaker.

The large proportion of formaldehyde required herein is essential to provide the desired water dispersibility.

What is claimed is:

1. An amine resin which is soluble in water with the aid of an acid, produced by reacting a dihydric phenolic compound with diepoxide having a 1,2-epoxy equivalency of at least about 1.4 and providing from 0.3 to 0.6 equivalents of epoxide in said diepoxide per equivalent of phenolic OH in said phenolic compound, and then reacting the reaction product containing less than 0.3 part of unreacted dihydric phenolic compound per part of said reaction product with at least about 3.25 mols of formaldehyde per mol of reaction product and with monosecondary amine to produce Mannich base groups, and then reacting with additional diepoxide in an amount of from 0.5 to 2 epoxy equivalents per epoxy equivalent in the initially used diepoxide.

2. An amine resin as recited in claim 1 in which said dihydric phenolic compound is a bisphenol and said diepoxide is aromatic.

3. An amine resin as recited in claim 2 in which more than 3.5 moles of formaldehyde are used per mol of starting bisphenol.

4. An amine resin as recited in claim 3 in which the only unreacted bisphenol present during the reaction with formaldehyde and monosecondary amine is that which was present during the reaction with aromatic diepoxide.

5. An amine resin as recited in claim 2 in which a diglycidyl ether of a bisphenol having a molecular weight of about 350 to about 5000 is reacted with a bisphenol in an amount of 0.3 to 0.6 equivalents of epoxide in said diglycidyl ether per equivalent of phenolic OH in said bisphenol.

6. An amine resin as recited in claim 5 in which said monosecondary amine component is a mixture of $C_1$–$C_8$ dialkyl amine and diethanol amine.

7. An amine resin which is soluble in water with the aid of an acid produced by reacting a bisphenol with a diglycidyl ether of a bisphenol having a molecular weight in the range of 350 to 600 in an amount of 0.3 to 0.6 equivalents of epoxide per equivalent of phenolic OH in said bisphenol, then reacting the product containing less than 0.3 part of unreacted bisphenol per part of said reaction product with more than 3.5 moles of formaldehyde per mol of starting bisphenol to solubilize the formaldehyde, and then reacting with a mixture of $C_1$–$C_8$ dialkyl amine and diethanol amine to produce a Mannich base, and then reacting with additional diepoxide in an amount of from 1 to 1.5 epoxy equivalents per epoxy equivalent in the initially used diglycidyl ether.

8. A amine resin as recited in claim 1 dispersed in water with the aid of an acid to provide a bath having a pH in the range of 5–9.

9. A water dispersion as recited in claim 8 in which an aminoplast or phenoplast resin is present in admixture with said amine resin to enhance the cure thereof.

10. An amine resin as recited in claim 7 dispersed in water with the aid of an acid to provide a bath having a pH in the range of 6–8.5, said amine resin being in admixture with an aminoplast resin.

* * * * *